(12) United States Patent
Sydir et al.

(10) Patent No.: US 8,538,434 B2
(45) Date of Patent: Sep. 17, 2013

(54) GPS ASSISTED NETWORK ADMINISTRATION

(75) Inventors: Jaroslaw J. Sydir, San Jose, CA (US); Kirk W. Skeba, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 472 days.

(21) Appl. No.: 12/459,145

(22) Filed: Jun. 26, 2009

(65) Prior Publication Data
US 2010/0330991 A1    Dec. 30, 2010

(51) Int. Cl.
H04M 3/42    (2006.01)
H04M 1/00    (2006.01)
H04W 4/00    (2009.01)

(52) U.S. Cl.
USPC ............... 455/436; 455/414.2; 455/456.1; 370/331

(58) Field of Classification Search
USPC ............ 455/436–438, 456.1, 343.1, 466, 455/414.1; 370/331
See application file for complete search history.

(56) References Cited

U.S. PATENT DOCUMENTS

| 6,711,408 | B1 * | 3/2004 | Raith | 455/440 |
| 2007/0258409 | A1 | 11/2007 | Alizadeh-Shabdiz et al. | |
| 2009/0047963 | A1 * | 2/2009 | Kim | 455/438 |
| 2009/0287402 | A1 * | 11/2009 | Liu et al. | 701/117 |
| 2010/0128697 | A1 * | 5/2010 | Choi-Grogan | 370/332 |

FOREIGN PATENT DOCUMENTS

| GB | 2389015 | 11/2003 |
| JP | 2008-283700 | 11/2008 |

OTHER PUBLICATIONS

IEEE 802.11 Handovers Assisted by GPS Information.*
Office Action received for Taiwanese Patent Application No. 099118580, mailed May 10, 2013, 6 pages including 2 pages English translation.
European Search Report received for European Patent Application No. 10792520.8, mailed May 7, 2013, 7 pages.
Office Action received for Japanese Patent Application No. 2012-516156, mailed Mar. 6, 2013, 9 pages including 5 pages English translation.

* cited by examiner

Primary Examiner — Nizar Sivji
(74) Attorney, Agent, or Firm — Kacvinsky Daisak PLLC

(57) ABSTRACT

Embodiments disclosed herein include methods, apparatus, and system architectures for using GPS within wireless networks to assist with wireless network management including handovers and data transfers, along with navigation decisions within heterogeneous networks.

14 Claims, 4 Drawing Sheets

GPS ASSISTED NETWORK ADMINISTRATION

TECHNICAL FIELD

The present invention relates generally to networks and in particular, to methods, devices, and systems for improving network operations.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of methods, apparatuses, and system architectures for using GPS within wireless networks to assist with wireless network management including handovers and downloads, along with navigation decisions within homogeneous or heterogeneous networks are described herein. Related techniques for coupling decisions that are made in a GPS navigation system with those that are made in wireless (e.g., voice and/or data systems) are described. These techniques can be used with mobile terminals having both GPS navigation support. As used herein, the term "mobile terminal" (also referred to as a wireless client or wireless subscriber) refers to a mobile device having wireless communications capabilities and GPS support, whether or not a GPS module is part of the same chassis as that containing the wireless client. That is, the GPS system may be in the same module with the wireless client or may be within separate modules but sufficiently proximal for use by a common user and for communication between one another.)

Some embodiments of the invention may involve the following approaches: (1) use of a planned (or expected) route (from GPS navigation system) to improve handover and scanning operation, (2) use of the planned route (from GPS navigation system) to enhance scheduling, (3) use of wireless communications service availability and expected quality of service (QOS) as a metric in selecting a route to be taken by a user. For each of these techniques, at least two realizations: a system-based and a client-based realization, may be employed. With a system based approach, the relevant wireless system participates in decision-making, and with a client-based realization, system information is learned and collected by the client where decisions may be made without substantial help from the wireless network.

Figure 1A:
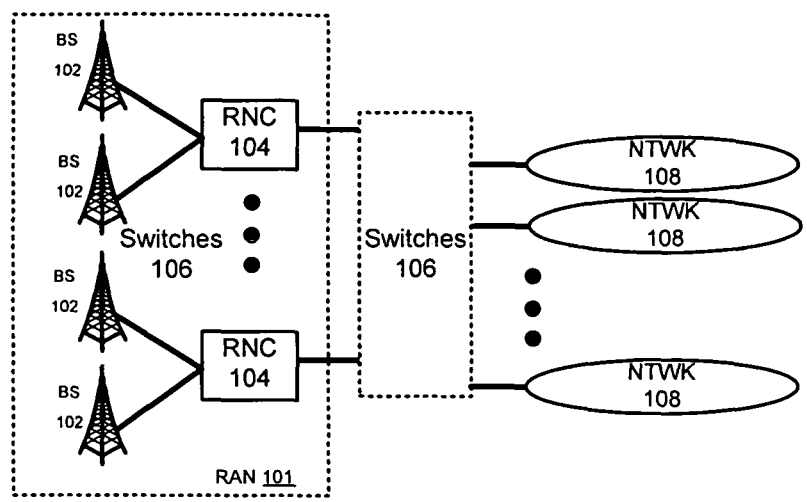
FIG. 1A is a diagram of a network system including a heterogeneous wireless access network in accordance with some embodiments.

FIG. 1A shows a simplified exemplary heterogeneous network with wireless access through a radio access network (RAN) 101. The RAN may be implemented as a homogeneous network, using a single wireless technology, or as a heterogeneous network, using a combination of different wireless technologies. The RAN allows mobile wireless clients (also sometimes referred to as mobile subscriber stations or mobile terminals) to access multiple different networks (NTWK) 108 through network switches 106. The networks 108 may comprise any networks including but not limited to voice and/or data networks such as the Internet (TCP/IP), the public switch telephone network (PSTN), other subscriber based voice/data networks, and others.

The switches 106 generally refer to the different switches (e.g., circuit and/or soft switches) used to find and/or connect a client to a desired target within the networks 108. They may also comprise gateway interfaces and any other server apparatuses for performing desired connectivity.

The RAN 101 includes base towers (BS) with transceivers 102. They are part of base stations (or nodes) and are coupled to radio network controllers 104 for controlling client access through the RAN, and ultimately, to one or more of the networks 108 or to another wireless client in the RAN. The base stations/radio nodes provide an air interface for transmitting and receiving signals with wireless clients. The base stations/nodes may also be coupled between each other, e.g., wirelessly or through cable connections. In many embodiments, they facilitate modulation/demodulation and depending on the utilized wireless communications scheme, physical channel coding, micro diversity, error handling, and/or closed loop power control.

The radio (or base station) controllers 104 may function to control radio resources and admission, allocate channels, control power settings, control handover, and/or control macro diversity, ciphering, segmentation/reassembly, broadcast signaling, and open loop power control. For some embodiments, it may also perform at least some of the GPS (position and/or route) assisted cell management such as controlling and/or assisting in handover, scanning, and download decisions.

The RAN 101 corresponds generally to a cellular RAN for a given wireless operator (e.g., Verizon™, AT&T™, and Sprint™), but as used herein, it may also encompass other types of access networks, depending, among other things, on characteristics of the wireless operator and wireless client such as how the network is configured, the type of wireless client, where it is, and the like. For example, it may encompass local area networks such as WiFi networks and the like that may be accessible to a wireless client. It may also comprise other or at least portions of other operator access networks such as when roaming is available. Accordingly, to avoid confusion, i.e., due to different nomenclatures used for different wireless standards, the term "infrastructure station" will be used generally to refer to any station (e.g., base station, node, transceiver station, access point etc.) that a wireless client may communicatively link with in the RAN. The term "access network" or "radio access network" is used to refer to cellular RANs while the term "sub-access network" is used to refer to other types of access networks such as wireless LAN. Sub access networks and the RAN can link to the same or separate destinations as the primary part of the RAN. A sub-access network is meant to refer to a network (such as a wireless LAN) with independently accessible access to a wireless client. For example, a mobile PC could have a wireless NIC or modem for accessing a provider network such as Sprint's™ 3G, 4G, or later network, and it could also include a WiFi card for accessing a WiFi network that may be in one's home or at a coffee shop. it could include other network interface control modules, as well. Thus, depending on where the wireless client is currently located, it could control whether provider access or sub-network access is used when more than one option is available. So, in some embodiments, scanning may include scanning for acceptable base stations within a primary provider network, along with other infrastructure station options separate from the primary subscriber network.

The RAN 101, as with some of the other networks 108, may be implemented using any suitable analog and/or digital wireless network schemes, including 2G, 2.5G, 3G, 4G, and beyond. Standards (or protocols) contemplated include but are not limited to CDMA (Code Division Multi Access), GSM (Global System for Mobile Access), PCS (Personal Communications Service), TDMA (Time Division Multi Access), FDMA (Frequency Division Multi Access) CDMA2000, HSDPA (High Speed Downlink Packet Access), WiMax, UMTS (Universal Mobile Telecommunication System), 3GPP, LTE (Long Term Evolution, based on GSM), WiFi, other Orthogonal Frequency-Division Multiple Access (OFDMA) based schemes, and more.

Figure 1B:
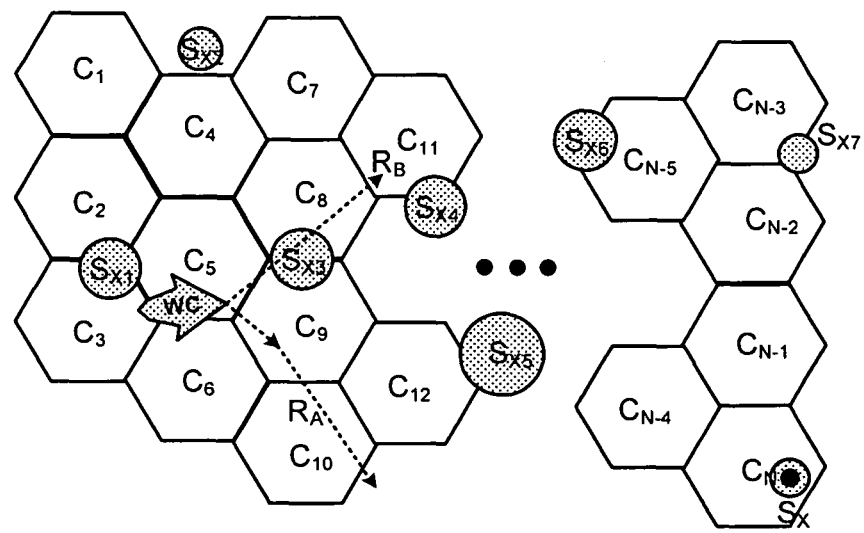
FIG. 1B is a cell layout diagram of the heterogeneous wireless access network of FIG. 1A in accordance with some embodiments.

FIG. 1B shows an exemplary cell layout for RAN 101, which may utilize a point-to-multipoint (PMP) cellular-like architecture. (Other types of architectures such as mesh broadband wireless, for example, may be used.) The diagram also shows a wireless client (WC) with two possible route plans ($R_A$, $R_B$). In this depiction, a single RAN representation is shown for simplicity with cells $C_1$ through $C_N$, along with sub access networks $S_{x1}$ to $S_{X7}$. It should be appreciated, however, that as mentioned above, other access networks or network portions may overlap the depicted primary RAN cell map. For simplicity, this is not shown, except for sub access networks ($S_{xi}$), which may include other access networks (e.g., wireless LANs) that are available to the wireless client. So as is depicted, different access options may simultaneously be available, presently, or predictably in the future, using GPS and/or route information. With different embodiments, approaches may be presented for deciding which infrastructure station (whether in the primary RAN, other RAN portion, or sub network $S_{xi}$) should be used for the next serving infrastructure station.

Transmission of data from within the RAN 101 to a wireless client may proceed in the following manner. Data such as IP packets or Ethernet frames may be encapsulated in an appropriate format (e.g., WiMax or LTE data frame format) and forwarded from a network 108 to an appropriate infrastructure station, e.g., the "serving" infrastructure station, within a given cell. (The "serving" or "server" infrastructure station, as used herein, is the infrastructure station currently linked with a wireless client to implement communication therewith. "Target candidate" infrastructure stations are infrastructure stations, e.g., detected from a scanning process, contemplated as a next serving infrastructure station, while the "target" infrastructure station is the selected one of the target candidates to be the next or otherwise later serving infrastructure station.) The serving infrastructure station then transmits the data to the wireless client using a unidirectional wireless link, which may be referred to as a "downlink" (or forward link). Transmission of data from the wireless client to a network destination proceeds in the reverse direction. In this case, the encapsulated data is transmitted from the wireless client to its serving infrastructure station, typically using a unidirectional wireless link referred to as an "uplink" (or forward link). After passing through the network controller, the data packets are forwarded through an appropriate switch, converted to an appropriate format, e.g., IP Packets or Ethernet frames, and transmitted henceforth to the desired destination.

Data (e.g., data bursts) are typically transmitted using either Frequency-Division-Duplexing (FDD) or Time-Division-Duplexing (TDD) schemes. In the TDD scheme, both the uplink and downlink typically share the same RF channel, but do not transmit simultaneously, and in the FDD scheme, the uplink and downlink normally operate on different RF channels, but the channels are transmitted simultaneously.

Figure 2:
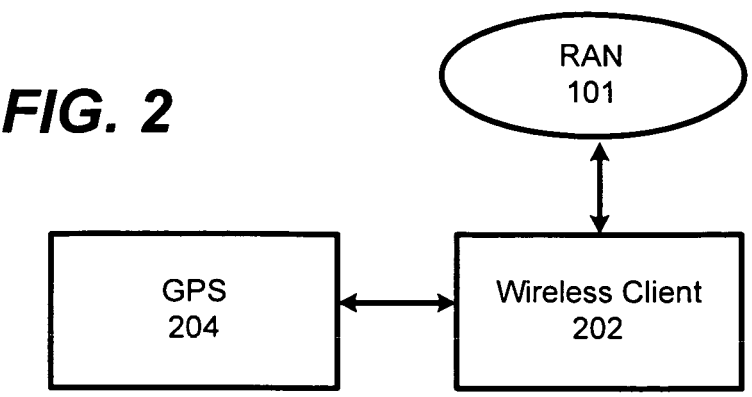
FIG. 2 is a diagram of a device with GPS assisted wireless services in accordance with some embodiments.

FIG. 2 shows a wireless client 202 coupled to a GPS module 204. They may be part of a common electronic device such as in a cell phone, smart phone, portable digital assistant (PDA), laptop PC, automobile dashboard, or alternatively, they may be in separate devices such as may be mounted in an automobile, airplane, or another mobile machine.

GPS (global positioning system) navigation modules are used for assisting users to identify a current location and to assist users in navigating from location to location. A GPS navigation module generally includes a GPS receiver that works in cooperation with GPS system satellites, to determine the location of the user and a navigation system which uses stored map information along with the current location of the user to help guide the user (e.g., driver) by providing driving directions to a specified destination. For example, a driver may enter a destination and the navigation system (e.g., device or server within the system) may then determine a route and provide step by step directions to the driver as the automobile traverses the route.

The wireless client 202, when in operation, is coupled to the access network 101. As the wireless client travels throughout the network 101 (as depicted in FIG. 1B), it is wirelessly linked to one of the cell or sub-network infrastructure stations. This linked infrastructure station is the serving infrastructure station. As the client travels through the access network area; it may link with different stations that become sufficiently proximal to it. The process of switching from the serving infrastructure station to the next serving infrastructure station is generally referred to as handover.

From the perspective of the mobile user (the person using the GPS-assisted wireless client), the performance of the network is measured by the QoS (quality of service) afforded to the user's connections throughout the lifetime of those connections. This measure of QoS is typically broken into traditional QoS parameters describing the treatment of data from a service flow (throughput, delay, and jitter) and the ability of the network to maintain an acceptable QoS level for connections as the user moves within the network. In the access network 101, a user may move from the coverage area of one infrastructure station to that of another, and QoS can be maintained if the second infrastructure station can provide at least the same QoS as the first. Thus, handover is normally an important operation within wireless systems. For example, services such as voice and video generally require that handover be performed without materially interrupting the flow of packets. That is, handover should appear seamless to the users of such services. Depending on how the wireless client is designed, it typically will repeatedly perform a scanning routine to look for a suitable target station from several different candidate stations.

In order to perform handover, the system (e.g., wireless client and/or access network infrastructure such as RNC or the like) generally determines which infrastructure station should be the target infrastructure station (the next serving station). In order to provide a seamless experience the target station should have sufficient resources to satisfy the QoS requirements of the connections that have been established with the wireless client. Thus, the wireless client establishes an association with the target infrastructure station, and connection state information is typically passed from the serving infrastructure station to the target infrastructure station.

In order to find a suitable target station, the wireless client may scan several different channels, corresponding to different infrastructure stations (e.g., from primary provider network and/or sub-network stations), to identify several different suitable station candidates for selection as the target infrastructure station. It may monitor their relative strengths of the candidate stations, e.g., as the wireless client progresses through the network, and may then select a target station based on one or more different factors such as strength, strength growth, strength-over-time, network management parameters, etc. At the same time, the network (e.g., RNC) may indicate that one or more of the infrastructure stations is not available or deter/prevent the WC from selecting one or more stations, e.g., in order to balance infrastructure station loading.

With different embodiments disclose herein, the GPS module 204 provides the wireless client with route and location data (e.g., expected route, destination, rate, current location, etc.). The wireless client and/or network infrastructure can then use this data to enhance scanning and/or selection of the target infrastructure station. For example, it could reduce the number of station candidates and/or scanning rate and thereby reduce overall power consumption in the wireless client. Network infrastructure may also use the GPS data in its network management functions, e.g., for more efficiently allocating network resources to clients with a better understanding of where they are and where they will be in the future.

Figure 3A:
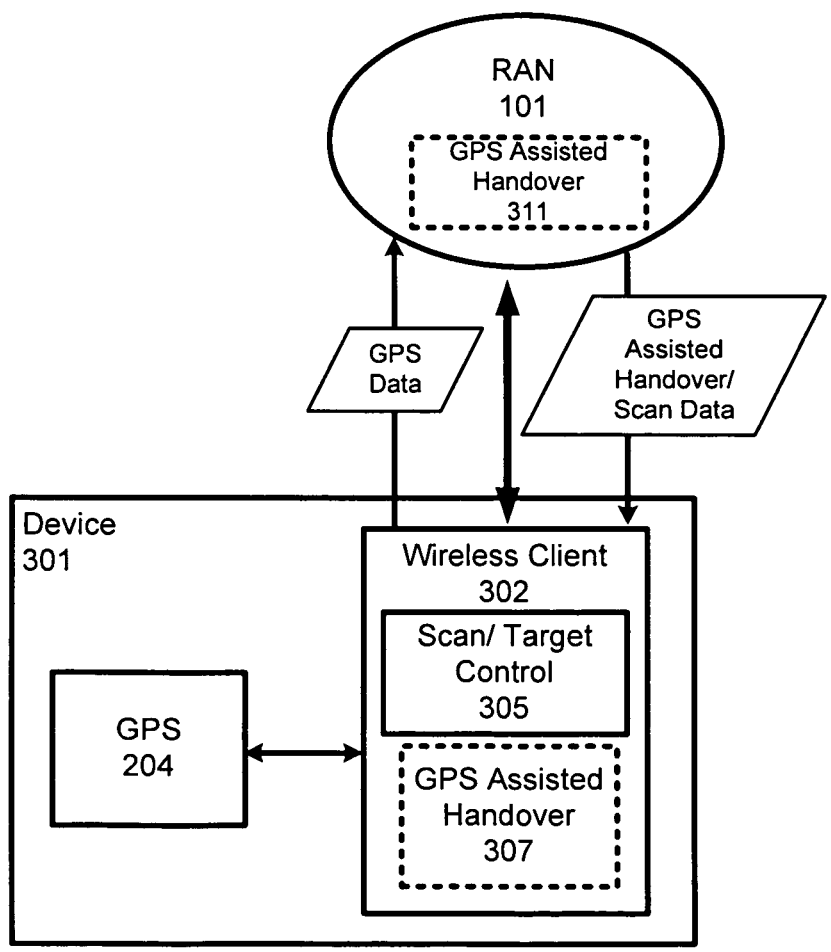
FIG. 3A is a diagram showing a wireless client with system-based GPS-assisted handover in accordance with some embodiments.

FIG. 3A shows a mobile electronic device 301 with a GPS module 204 and wireless client 202 having a scan/target control block 305 and a GPS assisted handover block 307. The access network also has a GPS assisted handover block. (These GPS-assisted handover blocks are in dashed lines because they may or may not be present to varying degrees, depending on a given embodiment.)

This embodiment illustrates a system-based GPS assisted handover implementation. Accordingly, as is depicted, GPS data (e.g., current location, expected route, etc.) flows from the device 302 to the access network 101, e.g., to the GPS assisted handover block 311, and GPS assisted handover/scan data is sent from the access network to the wireless client 301. This data may include candidate infrastructure stations and/or instructions to the client for infrastructure station selection and/or scan set reduction. In some embodiments, it may take the expected route information and compare it against coverage locations of different infrastructure stations to narrow the set of candidate stations for the client to scan. It may take this information into account, along with balancing objectives (need to balance use from numerous clients over limited number of stations) in generating instructions and data to be sent to the wireless client. That is, it may allow it to better allocate station resources for many users if it knows likely routes for some of the users for future station resource allocation.

Figure 3B:
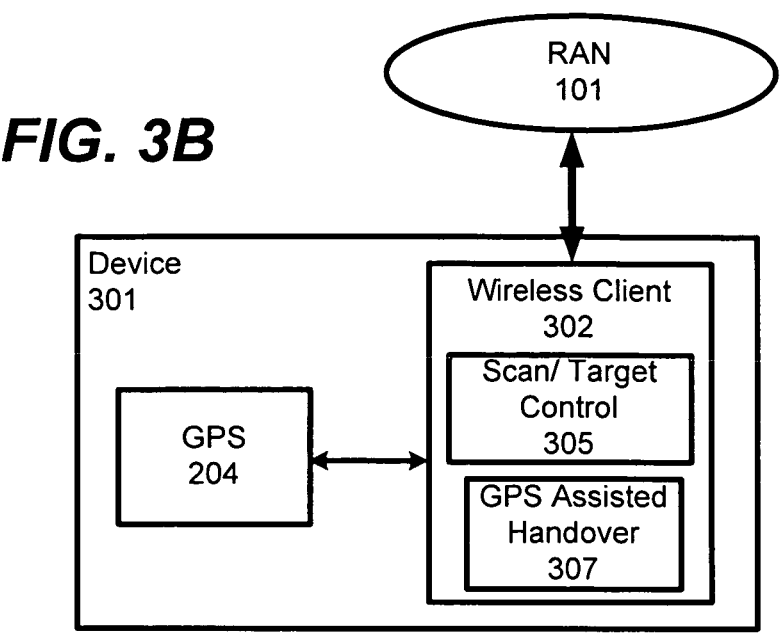
FIG. 3B is a diagram showing a wireless client with client-based GPS-assisted handover in accordance with some embodiments.

FIG. 3B shows a client based device 301. In this embodiment, the access network 101 does not necessarily have a GPS assisted block, because GPS assisted handover functions are performed in the wireless client, i.e., the GPS assisted block 307. Thus, the GPS data need not be transmitted to the access network. At the same time, the wireless client may have additional access to or memory for storing additional network environment information to enable it to perform GPS assisted handover tasks. For example, it may include location data for the different infrastructure stations, along with associated operating information.

In operation, the GPS module receives location and time information from the GPS system. It receives instructions from the user concerning the destination and prioritization of the metrics to be used to determine the best route. The GPS module provides route information to the Wireless Client.

The wireless client communicates with the access network and may receive inputs from the user concerning the communications needs of the user. Especially in a client-based embodiment, it also may store and draw upon information about the network. Some examples of the information that may be stored are the SINR (signal to noise ratio) values at different locations for different infrastructure stations in the network and historical loading information for individual cells or infrastructure stations. (This information can be obtained, for example, based on measurements made by the client and based on information that can be obtained from the network). In some embodiments, when the device is integrated into an automobile, information from the vehicle control system, such as rate of travel, could also be provided to the wireless client.

Knowledge of the expected route of the wireless client allows the wireless client and/or network to predict in advance the series of infrastructure stations with which the wireless client can associate as it traverses the route to its destination. This, along with the knowledge of the wireless client's current position allows the client and network to more efficiently determine the next target infrastructure station and to make the determination earlier, allowing more time for the serving infrastructure station and the target infrastructure station to exchange information. Knowledge of the route also allows the wireless client to perform more precise candidate scanning, reducing scanning time and improving battery life.

In a system-based realization of this technique (FIG. 3A), the wireless client and wireless network can collaborate by exchanging information about the route that the client is expected to follow. When a user enters a destination in the GPS module, the system determines the route to the destination and provides step by step directions to the user. This information along with the current position of the user and speed and direction of travel is provided to the wireless client. The wireless client sends this information to the access network (e.g., to the controller associated with its serving infrastructure station). This information can then be updated periodically as the wireless client moves along the route or as the route is recalculated.

The wireless network uses the expected route of the wireless client and its current location and heading to predict the target infrastructure station for the next handover or to narrow down the set of potential targets. The wireless network is also able to reserve the necessary resources within the infrastructure stations along the predicted route to support the QoS requirements of ongoing communications with the wireless client and to make admission control decisions based on the expected route when the wireless client wishes to establish additional connections. The wireless client may still be required to perform scanning, but scanning can be targeted at more likely infrastructure stations and the scanning frequency can be adjusted based on the speed at which the wireless client is traveling.

The interface between the wireless client and wireless access network can be standards-based or proprietary. Messages from the wireless client to the wireless network could include the following information: expected route (could be encoded as a series of segments or a series of turns or in some other format), the current location and heading of the wireless client, and optionally the current rate of travel. As an example, such a message can be added to a specification such as IEEE 802.16m, 802.21, 3GPP, etc.

In a client-based realization of GPS assisted handover (FIG. 3B), the wireless client may utilize information from the GPS navigation system along with historical information about the wireless voice/data network to optimize its scanning operations and handover requests. In this realization, the wireless client does not communicate the expected route to the wireless network, but simply uses the information about its expected route along with accumulated knowledge about the locations and identity of infrastructure stations within the area to predict the timing of handover operations and the potential target stations. This allows the wireless client to simplify the scanning operations and potentially to save on battery usage.

Figure 4:
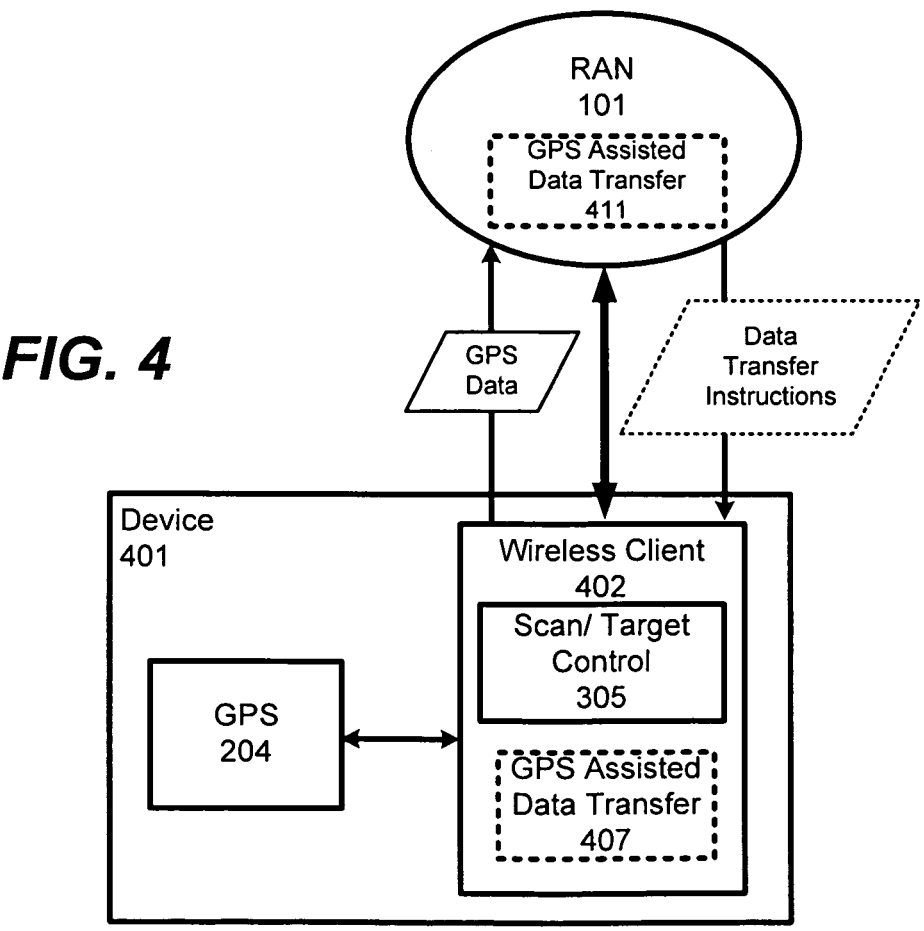
FIG. 4 is a diagram showing a wireless client with GPS-assisted download in accordance with some embodiments.

FIG. 4 shows an electronic device 401 that uses information from the GPS module, along with knowledge of the communication requirements of the user, to enhance the scheduling of data transmissions as the wireless client traverses the planned route. A user traveling to some destination may have a specific communication need (e.g., uploading a large file or downloading a video for later viewing) which does not need to be performed immediately. The user might indicate to the wireless client that such a transaction can be performed any time during the journey. The wireless client and/or network may then use the route supplied by the GPS navigation system along with knowledge of the network to schedule the transfer at a time that is optimal. For example, if the user is in an urban area where bandwidth is at a premium, the transaction can be deferred until the user has driven out of the urban area into a suburban area in which coverage is still good and there is spare capacity. Another example is that the transfer can be delayed until the user enters the coverage of a higher capacity network (for example if the users starts in an area where there is coverage only from a 3G network but ends up in an area where there is coverage from a WiMAX network).

As with handover previously discussed, GPS assisted data transfer can be realized in at least two ways: system and client based. (Both are represented in FIG. 4 with the use of the dashed lines.) In a system-based realization, the wireless client communicates the scheduling request to the wireless network in the form of a higher level bandwidth request. This request will typically include the size of the data transfer, the required QoS, the time by which the transfer should be completed and the expected path which the wireless client is expected to follow. The wireless network then determines a preferred time to schedule the transfer based on its internal knowledge of the network and communicates this to the wireless client. The wireless network can also use this information to reserve the necessary resources at the expected time and location (infrastructure station) when the transfer will occur. As the wireless client traverses the path, it periodically notifies the access network of its current location and any changes to its expected route. When the wireless client has reached the desired location, it is told by the wireless network the appropriate interface (e.g., WiMAX, WiFi) and to start the transfer.

With this realization, a protocol should be established between the wireless client and infrastructure devices. This protocol can be standards-based or proprietary. As an example, such a protocol can be added to a specification such as IEEE 802.16m or 802.21.

In a client-based realization, the wireless client relies on information that it has gathered about the network in order to make the decision. In this realization, standards support may not be required and the feature can be used as a client differentiation feature.

Figure 5:
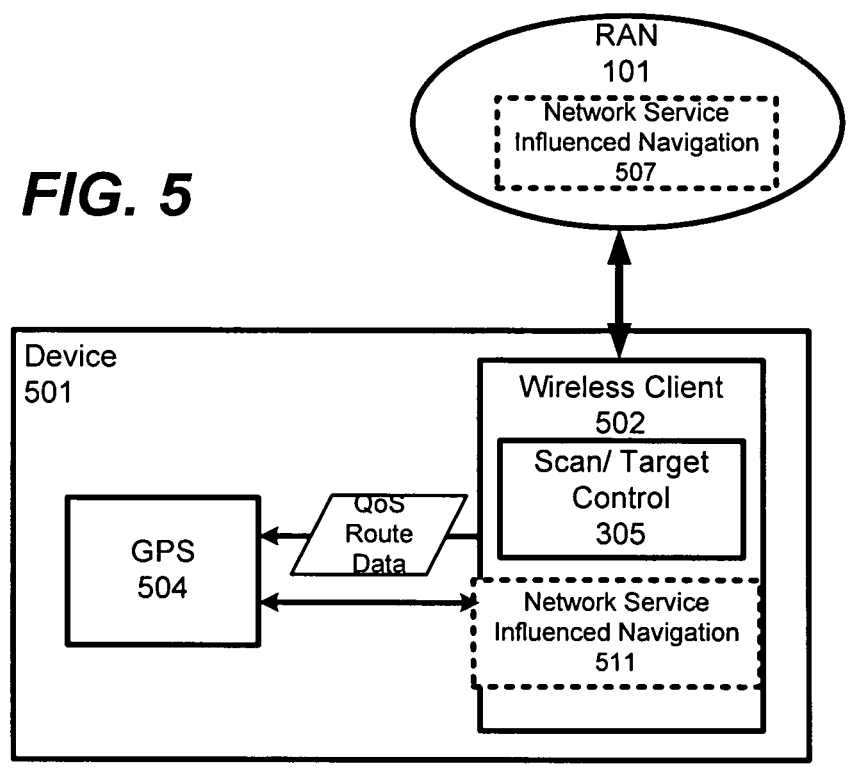
FIG. 5 is a diagram showing a GPS with wireless system influenced navigation handover in accordance with some embodiments.

FIG. 5 shows an electronic device 501 with a wireless client 502 and GPS module 504. The access network 101 and/or wireless client may include a QoS influenced navigation module (507 and/or 511).

This approach involves the use of wireless communications service availability and expected QoS as an additional metric within a GPS navigation system when selecting a route to a destination. The user indicates to the GPS navigation system a desired destination as well as information about the wireless communication needs for the journey. For example, the user may need to make an important phone call and may desire uninterrupted coverage for a voice call, or the user may wish for the passengers to be able to view a broadcast of an event and may wish to travel a route with sufficient coverage and capacity to provide a high definition video stream. The GPS navigation system is provided information on (e.g., from the wireless client) whether potential routes have wireless coverage and how well they satisfy the QoS requirements of the user and selects one or more routes (e.g., for presentation to the user) that meet the requirements while optimizing the other more traditional travel time/distance metrics.

As with the previous embodiments, this technique also can be realized in a system and/or client base approach. In a system-based realization, the access network provides information about the QoS that can be achieved on a proposed route. Using this approach, the wireless client "asks" the system whether a given set of connections will likely provide a given QoS level over a given route (or set of routes). The access network determines if there are sufficient resources along any of the proposed routes to provide the QoS over the route and may reserves resources along the selected route in order to provide the agreed QoS level. The user then traverses this route with a strong likelihood that QoS will be maintained, even as the user moves from the coverage area of one infrastructure station to another. (It should be appreciated that as with the other embodiments, whether or not a systems based approach is used, the client may continually or intermittently get information from the system to assist it with any decision making operation. For example, if it is providing QoS data to the GPS module for it to generate a route that achieves the desired QoS, it may ping the system to get updates on available QoS parameters from different stations, etc., to allow the GPS module to update its "plan" in order to meet service requests of a user.)

This realization may require standards support in order to define the messages for requesting that QoS be maintained across a given route or asking if it can be maintained across a route or set of routes.

In a client-based realization, the wireless client uses information that it has stored about the network to estimate which route will provide the best chances of maintaining the desired QoS. In this realization, standards support is not required but the client cannot generally receive a guarantee of end-to-end QoS because the system is not aware of the route which the user will take.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A device, comprising:
a wireless client to:
receive global positioning system (GPS) navigation data;
identify one or more target candidate infrastructure stations for the wireless client and select a target infrastructure station for the wireless client from among the one or more target candidate infrastructure stations based on the GPS navigation data;
generate, by a GPS assisted handover module, handover instructions for a handover of the wireless client from a current infrastructure station to the target infrastructure station, the GPS assisted handover module to identify infrastructure stations proximal to an expected route and to reduce a number of target candidate infrastructure stations based on the GPS navigation data and the expected route; and
perform the handover based on the handover instructions.

2. The device of claim 1, the GPS assisted handover module to process access network information and the GPS navigation data to generate the handover instructions.

3. The device of claim 2, the access network information comprising historical information about an access network comprising the current infrastructure station.

4. The device of claim 3, the historical information comprising accumulated knowledge about locations and identities of infrastructure stations within an area.

5. The device of claim 1, the wireless client wirelessly linked to a heterogeneous access network.

6. The device of claim 1, the GPS assisted handover module operative to reduce a target candidate infrastructure station scanning time or target candidate infrastructure station scanning rate based on the identified infrastructure stations.

7. The device of claim 1, the current infrastructure station comprising a Long Term Evolution (LTE) station, the target infrastructure station comprising a WiMax station.

8. The device of claim 1, the current infrastructure station comprising a WiMax station, the target infrastructure station comprising a Long Term Evolution (LTE) station.

9. A method, comprising:
receiving global positioning system (GPS) navigation data at a wireless client comprising a processor;
identifying one or more infrastructure stations sufficiently proximal to a prospective route;
identifying one or more target candidate infrastructure stations at the wireless client;
reducing a number of target candidate infrastructure stations based on the GPS navigation data and the prospective route;
selecting a target infrastructure station at the wireless client from among the reduced number of target candidate infrastructure stations based on the GPS navigation data and on access network information; and
generating handover instructions at the wireless client for a handover of the wireless client from a current infrastructure station to the target infrastructure station.

10. The method of claim 9, comprising reducing a target candidate infrastructure station scanning time or target candidate infrastructure station scanning rate based on the identified target candidate infrastructure stations.

11. The method of claim 9, the access network information comprising historical information about an access network comprising the current infrastructure station.

12. The method of claim 11, the historical information comprising accumulated knowledge about locations and identities of infrastructure stations within an area.

13. The method of claim 9, the current infrastructure station comprising a Long Term Evolution (LTE) station, the target infrastructure station comprising a WiMax station.

14. The method of claim 9, the current infrastructure station comprising a WiMax station, the target infrastructure station comprising a Long Term Evolution (LTE) station.

* * * * *